Figure 1:
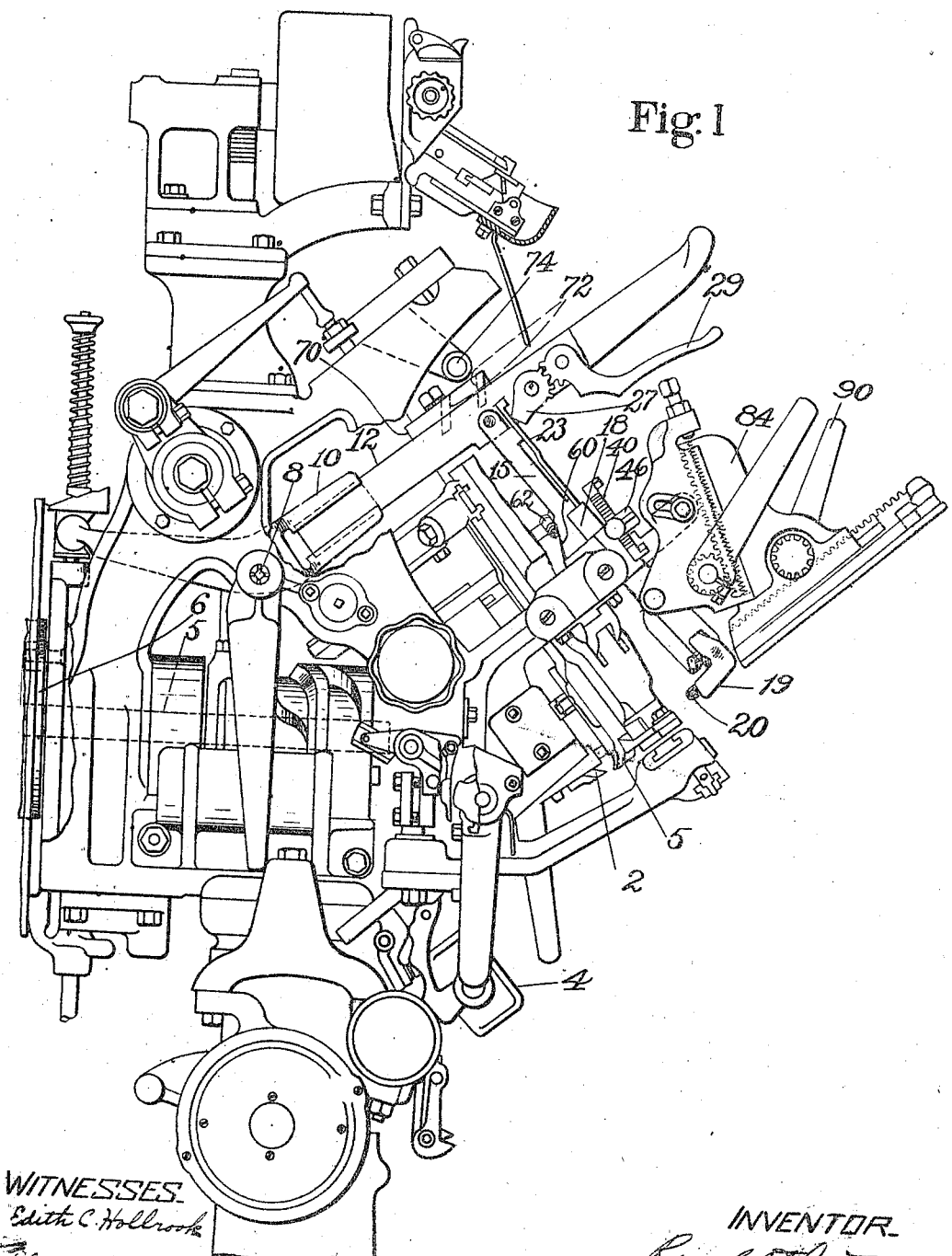

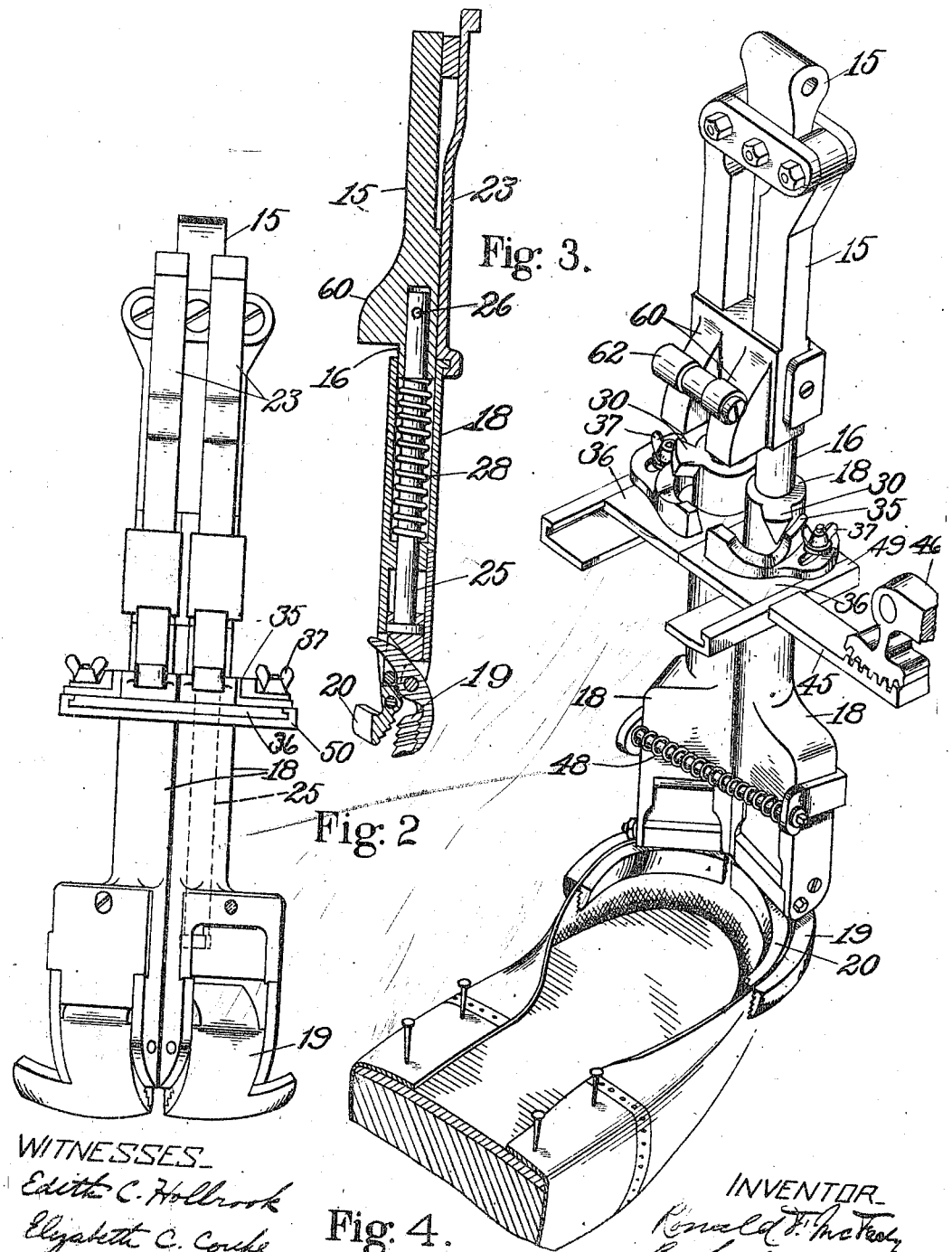

UNITED STATES PATENT OFFICE.

RONALD F. McFEELY, OF BEVERLY, MASSACHUSETTS, ASSIGNOR TO UNITED SHOE MACHINERY COMPANY, OF PATERSON, NEW JERSEY, A CORPORATION OF NEW JERSEY.

APPARATUS FOR MAKING BOOTS AND SHOES.

1,135,952.

Specification of Letters Patent.   Patented Apr. 13, 1915.

Application filed July 29, 1908. Serial No. 445,929. Renewed October 26, 1914. Serial No. 868,762.

*To all whom it may concern:*

Be it known that I, RONALD F. MCFEELY, a citizen of the United States, residing at Beverly, in the county of Essex and Commonwealth of Massachusetts, have invented certain Improvements in Apparatus for Making Boots and Shoes, of which the following description, in connection with the accompanying drawings, is a specification, like reference characters on the drawings indicating like parts in the several figures.

This invention relates to apparatus for working an upper over a last, certain features of the invention being directed particularly to grippers, their mode of operation, and actuating mechanism therefor.

A very important feature of this invention consists in grippers which are adapted to engage the upper about the end portion of a shoe and are formed in relatively movable, preferably curved sections arranged to adapt themselves to the contour of the end portion of the last. By this arrangement the same grippers may be employed with lasts of different widths and shapes and will conform to the shape of the particular last being used.

A further feature of the invention consists in means for returning to a uniform relative position gripper sections which have been relatively shifted to adapt them to the shape of the shoe last operated upon.

In accordance with the preferred arrangement which involves still a further feature of this invention the gripper sections are returned after each pulling operation to a starting position or relation in which they are or may be spread apart to receive the upper of a last of maximum size and are caused to pull the upper initially in a direction outwardly from the side faces of the last. An advantage of this feature of the invention is to be found in the fact that the upper is initially pulled over the top face of the last with a minimum of frictional resistance by contact with the side faces of the last. By this means the upper is first straightened over the top of the last, removing all wrinkles and fullness and then is gradually wrapped about the sides of the last, and as herein shown, finally drawn inwardly over the edge of the last and then laid down upon the last bottom. After the upper is released and while the grippers are being lowered to gripping position for the next shoe the sections are automatically spread apart. Provision is made for adjusting the spreading means to accommodate the range of sizes of lasts that are being used. A desirable characteristic of the illustrated construction is that the positioning means coöperating with the sections on one side of the last can be adjusted with relation to that at the other side whereby the grippers can be positioned to receive right or left lasts that have more swing or fullness on the outer side than on the inner side. It is customary to last a series of rights and then a series of lefts, as for example the rights and then the lefts of a case of shoes, and the positioning means can be made to return the grippers automatically to position for receiving such right lasts and then when the right shoes have been treated, can be adjusted to return the grippers thereafter to position for receiving the left shoes.

In addition to the provisions above described for relatively shifting or adjusting the sections of the grippers, or relatively changing their normal positions, a further feature of this invention contemplates provision for adjusting transversely of the last the grippers that engage the upper at the end and sides of the end of the shoe. It has heretofore been proposed as explained in my copending application Serial No. 372,055 to adjust a single toe gripper transversely of the last but it is new, as I am advised, to adjust widthwise of a last gripping devices which engage the upper at the sides as well as at the extreme end of the end portion of a last. This adjustment facilitates the positioning of the grippers with relation to crooked lasts or those in which the median line of the forward portion extends obliquely to the median line of the rear portion. When the heel portions of such lasts are supported in substantially uniform position the toe end of a right last is located at the right of the central position of the grippers and the toe end of a left last at the left side of that position and the transverse adjustment of the forepart grippers is of obvious importance in order to obtain a suitable square pulling of the upper. When the widthwise adjustment is used with the relative adjustment of the curved gripper sections, as is herein shown, the grippers can be positioned to receive a crooked last having excess of swing on its outer side in approximately the same relation as a straight last is received.

In accordance with a further feature of this invention means is provided for simultaneously adjusting the grippers for swing and crookedness of the last. The means illustrated has also provision for independent adjustment of the grippers sections transversely and rotatively.

Another feature of this invention consists in the combination with grippers that have jaws curved or arranged to present substantially continuous gripping faces for engaging an upper at the sides and end of the toe portion of a shoe, of means for actuating the grippers upwardly and forwardly with relation to an inverted last. By this combination the grippers are caused to apply to the full width of the forepart of the upper a forward strain which draws the entire upper toward the toe of the last prior to wrapping the upper over the end of the last.

A further very important feature of this invention consists in means for actuating gripping devices which engage the upper at the toe end and the opposite sides of the toe portion of the shoe. These devices are herein shown as the sectional curved grippers before referred to which are formed to embrace the toe portion of the shoe and to receive and pull the upper throughout the breadth of its forward portion, at the sides as well as at the end of the toe but no limitation not clearly expressed in the claims is to be implied by the illustration of this particular embodiment of the invention. In accordance with this feature of the invention as herein applied the portions of the grippers that pull the upper at the sides of the shoe are lifted relatively to the portion which pulls at the toe end of the shoe. This relative movement occurs near the end of the pulling operation and by thus actuating the grippers the upper is first stretched forwardly and upwardly over the toe end and then the portion engaged by the rear parts of the grippers receives an additional pull that draws it snugly to the last. If the grippers present substantially continuous gripping edges as herein shown the relative uplift of their rear ends affects an additional pull which is of maximum extent at the rear ends of the jaws and gradually decreases toward the toe. This additional pull is of special value in conforming an upper to a last, such as many in use at the present time, which is high or thick over the toe and relatively lower from the toe to and over the ball. It is particularly difficult to shape the upper over such a last but this movement of the grippers produces a tightening of the upper over the rear sloping face of the high toe that is very effective. In the preferred embodiment of this invention the whole forepart gripper is actuated forwardly during its uplifting movement and particularly during the first part of that movement. This effects a forward pulling of the entire upper throughout its breadth as distinguished from a pull that is exerted by a narrow upwardly-drawing toe gripper mainly along the middle of the upper, and thus more thoroughly takes the lengthwise stretch from the upper and also draws it over the toe with a minimum of binding against the side faces of the last. Another advantage incident to this forward pull is that the upper is drawn downwardly along the inclined top face of the last. This forward pulling of the upper preferably begins while the upper is held away from the side faces of the last at which time the upper may be pulled over the top of the last with the least frictional resistance. This forward movement of the grippers is effected as shown by a cam over which the gripper bar engages as the bar is lifted. During this lifting the upper end of the bar engages an incline by which that end is moved forwardly, the bar fulcruming on the cam and the rear or heel end of the gripper jaws being relatively lifted while the jaws may swing backwardly somewhat, but this backward movement is partially or wholly offset by the inclination of the said cam. By this movement the upper is drawn into the incline at the back of the toe and is wrapped over the toe end while under tension for conforming it to the contour of the last.

In the form of grippers herein shown which include sectional curved jaws the work of centering the last laterally is very much facilitated. By the use of the device for shifting the grippers laterally, as herein explained, the grippers may be adjusted to position right and left crooked lasts in proper lateral relation to the side grippers and the other instrumentalities of the machine. As explained in Letters Patent of the United States No. 1,030,264, granted on my prior application, Serial No. 540,221, filed Jan. 26, 1910, the side grippers of the machine in which this invention is shown as applied are adapted to be employed as gages or tip seam position indicating means by the aid of which the operator can insert the upper with the tip seam in predetermined relation to the machine. By the use of the last end abutment additional accuracy is secured as to the length of the toe tip from the end of the last to the tip seam. Also by the use of a last end abutment which also centers the last laterally there is greater surety of obtaining a correct angular relation of the tip seam to the longitudinal axis of the last, or as it is called, a "straight" tip seam. This is particularly the case when, in making shoes on crooked lasts, a means is employed for adjusting laterally the last end abutment constituted by the toe gripper to adapt it for the right and the left last.

In the machine herein shown as embodying this invention wipers are employed to wipe into lasted position about the forepart of the last the upper which has been pulled by the described grippers. These wipers are mounted by means which includes a novel feature of the present invention to adjust themselves to a crooked last by movements similar to those described for the grippers. These wipers are actuated backwardly from the toe end and are simultaneously closed inwardly from the sides of the shoe to force the upper over the last bottom into lasted position. The backward movement of the wipers has an obvious tendency to force backwardly along the edge of the last the upper at the sides of the shoe. This backward pressure on the upper has a well recognized tendency to produce fullness, sometimes resulting in a wrinkle in the upper, at the ends of the wipers. It is a feature of this invention that the forward movement of the grippers which engage the upper at the sides as well as at the toe end stretches the entire forward portion of the upper toeward, including the marginal portion at the sides of the shoe as well as at the toe end. This offsets partially or wholly the backward push of the wipers at the sides of the shoe and prevents the formation of the objectionable fullness which has heretofore been difficult to avoid. Preferably the grippers hold the upper under forward tension while the wipers are acting thereby still further counteracting the backward push of the wipers.

The patentable novelty herein disclosed which relates to improvements in methods of making shoes and which may advantageously be practised by the aid of the described mechanism, although it may also be employed with other apparatus or in making shoes wholly or partially by hand, is not claimed in this application but constitutes the subject-matter of a divisional application Serial No. 599,337.

These and other features of this invention which it is my intention to protect will be more fully explained in connection with the description of the mechanism in which I have illustrated the invention as embodied and will then be restated in the claims.

Figure 5:
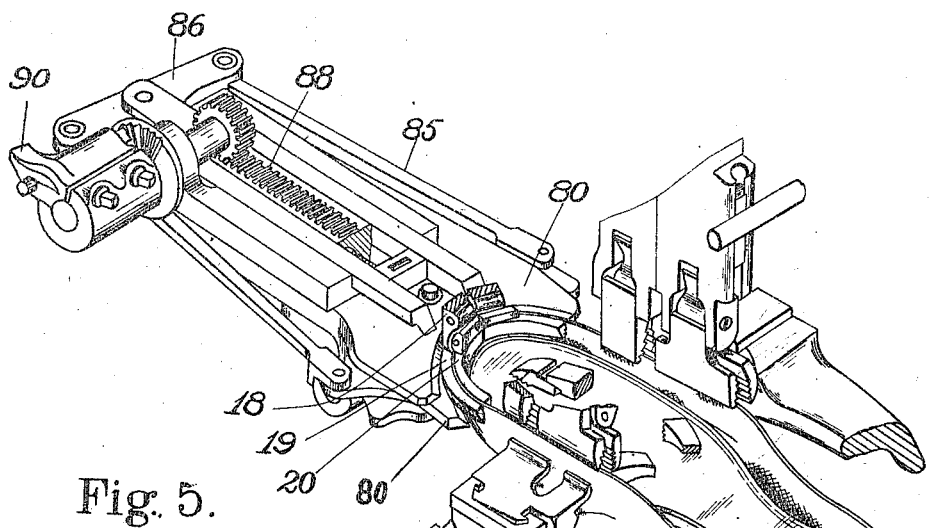
Figure 6:
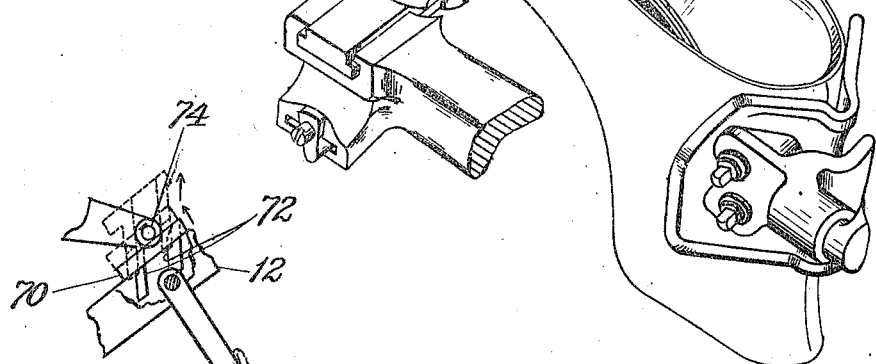
Figure 7:
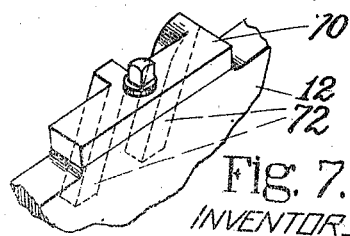
Figure 8:
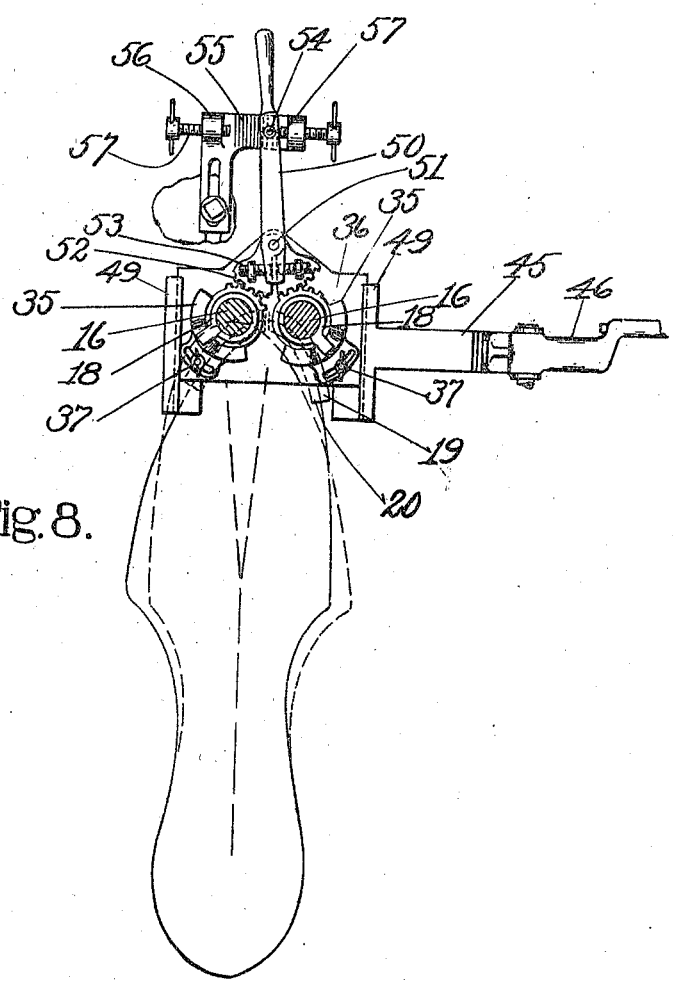
Figure 9:
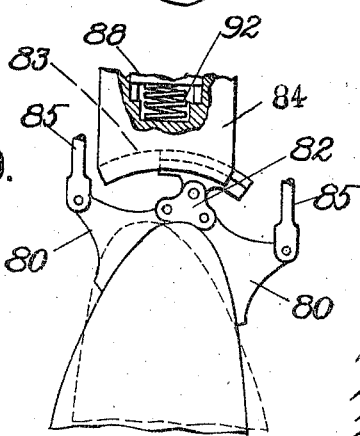

Figure 1 is a side elevation of a machine embodying this invention. Fig. 2 is a front elevation of the fore part grippers. Fig. 3 is a vertical section. Fig. 4 is a perspective view of the grippers showing them in a position occupied after they have gripped and pulled the upper. Fig. 5 is a perspective view of the grippers and the wipers of the machine. Fig. 6 is a detail view showing different positions occupied by the grippers during their pulling movement. Fig. 7 is a detail of a part shown in Fig. 6. Fig. 8 shows means for adjusting the grippers to adapt them to lasts of different shapes. Fig. 9 shows the end lasting wipers and the means by which they are permitted to adjust themselves similarly to the grippers.

The machine which except for the gripping and pulling means may be the same as that shown in said copending application comprises means for resting a shoe including a bottom rest 2 and a heel rest 4. The mechanism for pulling the upper is actuated from a main driving shaft 5 which has cams 6 for rocking the gripper carrying levers. The present invention is particularly concerned with the gripping devices operating at the fore part of the shoe. The lever by which these devices are carried and actuated is shown in Fig. 1 of the drawings as fulcrumed at 8 and formed in two parts 10 and 12 relatively movable lengthwise, and having sliding engagement one with the other. The forepart gripping device comprises a bar 15 pivotally suspended from the member 12 of the gripper lever. This bar has two depending studs or rods 16, each of which slides in a sleeve which forms the upper end of a carrier 18. The gripping members, which comprise pivoted jaws 19 and relatively fixed jaws 20, are formed in sections, one section of the fixed jaw and one section of the pivoted jaw being supported by each of the carriers 18. The construction of a carrier and its jaws is shown in the sectional view, Fig. 3, wherein it will be seen that the rigid member 20 is immovably fixed to the carrier, while the movable member 19 is pivoted to the carrier and has a tail piece extending upwardly between guiding surfaces on a plunger 25. The plunger is fastened by the pin 26 to the bar 15 and the carrier 18 is yieldingly pressed downwardly with relation to the bar and the plunger by a spring 28. This arrangement causes the carrier with its jaws to be moved by the spring downwardly with relation to the contacting faces on the head of the plunger, whereby the pivoted jaw is swung toward the fixed jaw for closing the grippers. When the lever 10, 12 is moved in the direction for uplifting the grippers the movement is transmitted through the bar 15 and the plunger 25 for maintaining the grippers closed.

In order to open the grippers the carrier 18 is provided with shoulders 30 (see Fig. 4) adapted to engage seats or abutments which are rigidly supported and hold the carrier with relation to the descending bar and the plunger, thus forcing the contacting faces of the plunger downwardly along the tail piece of the pivoted jaw and rocking the jaw into the position shown in Fig. 2. The gripper carriers can be raised manually, with relation to the bar 15 and the plunger 25 for opening the jaws after they have been closed, by the bar 23 which engages a shoulder on the upper end of the carrier and extends into position to be engaged by a swinging member 27 pivoted to the lever section 12 and having toothed engagement with a hand lever 29. The jaws are curved and preferably have substantially continuous gripping faces to receive the upper on the opposite sides and the end of the toe or forward portion of the shoe, as shown best in Figs. 4 and 5. As herein shown, the rear or heel portions of the jaws extend backwardly from the carrier a considerable distance for engaging the upper along the sides of the shoe.

The arrangement by which the sections of the jaws at opposite sides of the middle of the shoe are separately mounted upon the rotatable carriers 18 permits the jaws to be adjusted or spread for shoes of different sizes. Preferably the jaws will be formed and normally positioned in a larger curve or a curve of longer radius than the curvature of the end portion of the last. For positioning the sections of the jaws each shoulder 30 is arranged to engage a positioning device 35 having inclined walls between which the shoulder becomes seated and by which the carrier is angularly adjusted on its stem 16 when the grippers are depressed and opened for receiving the stock. The positioning devices 35 are supported on plates 36 for angular adjustment and to this end said devices have curved slots through which extend pins from the plates 36. The pins carry clamping or fastening means 37 which may be set up for holding the positioning devices in adjusted position. It will be observed that the devices 35 for the two sides of the grippers are independently adjustable so that they may be relatively positioned to adapt the sections of the grippers to lasts having more swing on the outer side than on the inner side. The described positioning means determines the annular relation of the sections of the grippers when in gripping position and their relation during the initial portion of the pulling movement. As the pulling movement progresses, however, the shoulders 30 rise out of contact with the positioning devices and the sections of the grippers are then free to position themselves according to the edge contour of the forward portion of the last. A spring 48 mounted on a rod extending between ears on the outer edges of the carriers 18 may be employed for holding the sections normally spread apart with a yielding force. By this spring the sections of the grippers are yieldingly restrained and steadied in swinging together during the upper stretching operation. The more important function of this spring, however, is to separate or swing outwardly the sections of the jaws after the jaws have been closed inwardly during the action of the wipers, as will be later described.

The plates 36 through which the carriers 18 are guided and upon which the positioning devices 35 are adjustably supported are themselves mounted for adjustment transversely of the machine or widthwise of the last. To this end said plates are connected with a rack bar 45 which is engaged by a segment on a lever 46 having a spring locking pin for engaging a ratchet 40 to hold the rack bar in adjusted position. The connection between the rack bar 45 and the plates 36 is an indirect one formed by the guide bars 49 in which the plates 36 are movable forwardly and backwardly or lengthwise of the last.

Fig. 8 shows means which may be used with the parts shown in Figs. 1 and 4 for simultaneously adjusting angularly the positioning devices 35 for the two gripper sections and, inasmuch as the shoulders 30 on the gripper section carriers rest in the devices 35 the illustrated construction provides means for adjusting the curved fore part grippers angularly about an axis in the line of their pulling movement. As shown in said figure, the plates 36 have toothed collars surrounding the gripper carriers 18 and a lever 50 is pivoted at 51 on the plate 36. Segments 52 are mounted on the same pivot and are independently and adjustably connected by readily accessible screws 53 to the adjacent short arm of the lever. The long arm of the lever extends forwardly where the operator can readily engage it for adjusting the positioning devices and therefore the gripper sections together angularly, it being understood that the clamps 37 are loosened at such times. A spring pin 54 engages a fixed roughened plate 55 to retain the lever in its adjusted position. This plate 55 is shown as having ears 56 which receive adjustable stop screws 57. These screws may serve to limit the throw of the lever for the particular style of lasts being operated upon which have excess of swing on their outer sides. The lever would be thrown against one stop as shown to adjust the grippers angularly for a right last and against the other stop for a left last. Most of the lasts in use are crooked as well as having excess of swing on the outer sides and the arrangement shown in Fig. 8 provides for simultaneously adjusting the grippers transversely of the last and also angularly. The lever 50 is pivoted to the plate 36, while the plate 55 is stationary so that when the lever 46 is manipulated the lever 50 moves bodily with the plate 36 until its outer end strikes one of the stops 57, when it begins to turn and thereby turns the positioning devices 35 to adjust the gripper sections angularly for the swing of the last while the grippers are being adjusted transversely of the shoe for crookedness of the last. In the drawing the grippers are shifted toward the right to position them in the median line of the fore part of the crooked right last shown in full lines. In this movement the lever 50 has met the stop on the right-hand end of the plate 55 and has turned both gripper sections in the same angular direction, the one at the right having moved inwardly and the one at the left having turned outwardly for the greater swing on the outer side of the full line right last. The dotted lines show the position which a similar left last will occupy and it will be readily understood that a movement of the slide 45 toward the left will effect the appropriate adjustment of the grippers for that last. It will be observed that transverse adjustment alone takes place during the first part of the movement of the adjusting slide 45 and that the angular or turning adjustment of the grippers occurs during the last part of that movement of the slide. A limited lateral adjustment to either side of the median line of the machine can, therefore, be obtained without effecting angular adjustment. By adjusting the stops 57 the amount of angular adjustment of the grippers automatically obtained during the lateral adjustment can be varied or they can be retracted to render them inoperative and angular adjustment when required be obtained by separate movement of the lever 50.

The gripper bar 15 is provided on its rear face with a cam surface 60, or as shown in Fig. 4 with a pair of cam surfaces 60, adapted to engage a roller 62 which is maintained in a fixed position during the uplifting movement of the grippers and serves to swing the gripper bar and the jaws forwardly. By this means the upper at the opposite sides and the end of the forward portion of the shoe is strained forwardly while being pulled upwardly. The member 12 of the gripper lever has a plate 70 provided with depending guideways 72, the adjacent faces of which are inclined upwardly and forwardly, as shown in Fig. 1. The frame of the machine supports a roll having a stud 74 with which these inclined guiding faces are adapted to engage as the lever rises for pulling the upper. This engagement compels the member 12 of the lever to slide forwardly with relation to the member 10, thus carrying the upper end of the gripper bar forwardly and causing that bar to fulcrum or rock about its point of engagement with the combined roller 62. The combined effect of the cams 60 and the inclines 72 on the gripper bar is to swing or tilt the rear or heel ends of the gripper jaws upwardly. The movements of the jaws caused by the cam faces and the inclines are represented diagrammatically in Fig. 6. It will be observed that the cam face 60 partially neutralizes the tendency of the incline 72 to move the gripper jaws backwardly while it does not lessen the upward movement or lifting of the heels of the jaws.

The machine comprises means fully explained in said co-pending application and in United States Letters Patent 663,777 for effecting or permitting relative adjustment of the upper and last after the upper has been pulled and while it is held under tension for the purpose of straightening and accurately positioning the upper in pulled over position upon the last. The construction of this mechanism forms no part of the present invention and is, therefore, not here described.

The lasting devices for forcing the pulled-over upper into lasted position comprise the side wiper plates 80 and the connecting wiper plate 82 mounted in a curved guideway or groove 83 in the carrier 84 for free sliding movement transversely of the last. The side wipers are connected by links 85 and an equalizing bar 86 with a rack bar 88 arranged to be actuated by a shaft having a hand lever 90, as shown in Figs. 1 and 5. A spring 92 forms a yielding element between the connecting plate 82 and the rack bar 88. The arrangement of the wipers and their actuating mechanism permits the wipers to move transversely of the shoe in a curved path to adjust themselves as indicated in Fig. 9 to the position and the shape of the last and causes the wipers to be moved lengthwise of the last and simultaneously closed inwardly over the bottom of the last from the opposite sides as the hand lever 90 is turned. During this movement of the wipers the grippers may be forced backwardly more or less and will also close inwardly over the shoe bottom, the roller 62 controlling the backward movement of the grippers and preferably causing them to maintain a forward tension on the marginal portion of the upper.

In the use of the machine a shoe will be positioned against the rests 2 and 4 and the marginal portion of the upper inserted between the gripper jaws which are automatically depressed and opened at the end of each operation. The form and position of the sections of the fore part grippers adapts them to receive the forward portion of the last and upper about the curved end of the last and the continuous gripping faces hold the upper without permitting any wrinkles to form in it. When the machine is started the grippers are closed and uplifted, the fore part grippers gripping and pulling the entire toe portion of the upper at both sides substantially as far back as the usual lasting wiper plates reach as well as at the toe end of the last. The positioning devices 35 spread the sections of the grippers apart and insure an initial pulling of the upper obliquely away from the sides of the last whereby the upper is drawn over the top face of the last. As the stops 30 rise from their seats in the positioning devices the carriers 18 are permitted to swing by the tension of the upper to adapt the position of the jaws to the width and shape of the last and in this movement the upper is wrapped or drawn up against the side faces of the last. During the rise of the grippers the cam 60 forces the grippers forwardly, causing the sides as well as the toe end of the upper to be strained lengthwise of the last. The upper and particularly the marginal portion of the upper is preferably held under such lengthwise strain or tension during the subsequent operations on the shoe. In the latter part of the rise of the grippers the inclines 72 become operative for moving the upper end of the gripper bar forwardly and lifting the heel ends of the gripper jaws. This movement of the heel ends of the jaws effects a final pull on the upper at the sides of the toe with relation to the upper at the end of the toe. This movement is of particular importance in drawing the upper snugly down to the wood of the last over the sides of the toe and if the last is formed, as is common at the present day, with a nub or high place over the toe, as indicated in Fig. 6, the relative upward movement of the heel ends of the jaws draws the upper down upon the rear incline of this high place, conforming the upper to the last at a portion of the shoe which has heretofore been difficult to shape snugly. The machine automatically comes to rest with the upper under tension to permit the operator to inspect the shoe and adjust the upper to the last relatively. If at this time it is found that the fore part gripper has not so engaged the upper as to pull it correctly upon the particular last in the machine the gripper may be shifted or moved transversely of the last by means of the rack bar 45 and the lever. This adjustment may be employed for effecting a movement of the upper transversely across the last especially the part of the upper at the sides of the toe engaged by the rear portions of the jaws. If needful the gripper lever which is provided with a handle on its front end and is yieldingly connected to its cam at the rear end may be depressed to slacken the pull of the forepart grippers while this adjustment is being made or for any other purpose and in the event that the operator finds it necessary to release the toe portion of the upper the gripper jaws may be opened and reengaged with the upper by manipulating the hand lever 29. After the upper has been pulled and such adjustments made as are necessary for completing the pulling-over operation the wipers are advanced for forcing the upper inwardly over the edge of the shoe bottom. In this operation the wipers must move rearwardly or lengthwise of the shoe. This movement of the side wipers backwardly in contact with the upper as they are being closed inwardly tends to push the upper backwardly at the rear ends of the wipers, but this tendency is offset or partially offset by the forward pull which has been given to the upper and preferably also by the fact that the grippers are still holding the upper under lengthwise tension. Thus the formation of fullness or wrinkles at the rear ends of the wipers of the end-lasting mechanism is avoided.

If the lasts on which the shoes are being pulled-over and lasted have more swing or projection on the outer side of the toe or fore part than on the inner side the devices 35 may be relatively adjusted to position the sectional gripper jaws properly for the right or the left shoes and when the right shoes, for example, of the case or group have been pulled-over and lasted the positioning devices will be readjusted for the left shoes. If the lasts are crooked lasts having the median lines of the fore part at an angle to the median line of the heel part the adjusting means 45, 46 as well as the devices 35 may be shifted for positioning the fore part grippers at the right hand side of the median line of the machine for pulling and lasting the left shoes and at the left hand side of the median line of the machine for pulling and lasting right shoes.

Having explained the nature of this invention and described a preferred construction embodying the same, I claim as new and desire to secure by Letters Patent of the United States:—

1. A machine of the class described, having, in combination, grippers comprising curved jaws arranged to engage the upper in a substantially uninterrupted line extending around the toe of the last and means for adjusting said grippers as a unit transversely of the last.

2. A machine of the class described, having, in combination, grippers comprising curved jaws arranged to engage the upper in a substantially uninterrupted line extending around the toe end of the last, and means for supporting the grippers constructed and arranged to permit them to be adjusted as a unit transversely of the last.

3. A machine of the class described, having, in combination, grippers comprising curved jaws formed in relatively turning sections for engaging the upper around the toe of the last, and means for supporting the grippers.

4. A machine of the class described, having, in combination, grippers comprising curved jaws for engaging the upper around the toe of the last, and means for supporting the grippers constructed and arranged to permit them to be shifted transversely of the last and to turn whereby they may be adapted to the position and shape of the toe end of the last.

5. A machine of the class described, having, in combination, grippers comprising curved sectional jaws freely movable relatively while the upper is under tension to adapt the grippers to the shape and size of the last.

6. A machine of the class described, having, in combination, grippers comprising curved sectional jaws freely movable transversely of the shoe to adapt their shape to the edge contour of the toe end of the last.

7. A machine of the class described, having, in combination, fore part grippers comprising curved sectional jaws movable about adjacent axes located at the toe end of the last to adapt their relative position to the width of the last.

8. A machine of the class described, having, in combination, fore part grippers comprising curved sectional jaws each movable about an axis located at the toe end of the last to adapt their relative position to the width of the last, and means for automatically returning the jaws to a predetermined relative position for gripping.

9. A machine of the class described, having, in combination, grippers comprising curved sectional jaws each movable freely about an axis located at the end of the last whereby their relative position while pulling the upper is adapted to the width of the last, and adjustable means to vary the gripping position of the jaws.

10. A machine of the class described, having, in combination, grippers comprising curved sectional jaws movable about adjacent axes located at the toe end of the last to adapt their relative position to the width of the last, and means for determining the gripping relation of the sections, said means being adapted for adjustment to cause the curved jaws to face in the desired direction relatively to the median line of the machine.

11. A machine of the class described, having, in combination, grippers provided with curved jaws to engage the upper at the toe end and opposite sides of the forward portion of a shoe, means for actuating the grippers to pull the upper, means for supporting the grippers to permit them to move for carrying the upper inwardly over the last bottom, and independently movable means for forcing the upper into lasted position on the last bottom.

12. A machine of the class described, having, in combination, grippers provided with curved jaws to engage the upper at the toe and opposite sides of the forward portion of a shoe, means for actuating the grippers to pull the upper, and means for adjusting the jaws together transversely of the last.

13. A machine of the class described, having, in combination, grippers provided with curved jaws to engage the upper at the toe end and opposite sides of the forward portion of a shoe, and means for actuating the jaws to pull the gripped upper at said end and sides of the shoe forwardly while it is being pulled upwardly.

14. A machine of the class described, having, in combination, grippers provided with curved jaws to engage the upper at the toe and opposite sides of the forward portion of a shoe, means for actuating the grippers to pull the upper, and means for actuating the jaws to pull upwardly on the portions of upper at the sides of the shoe relatively to the portion at the toe end.

15. A machine of the class described, having, in combination, grippers provided with curved jaws to engage the upper at the toe end and opposite sides of the forward portion of a shoe, means for actuating the grippers to pull the upper, means for actuating the jaws forwardly during the pulling movement, and means for lifting the rear portions of the jaws relatively to the front portions.

16. A machine of the class described, having, in combination, grippers with wide jaws adapted to engage the upper for a substantial distance along the edge of the last, and means for actuating the grippers to pull the upper comprising means for lifting one end portion of the jaws relatively to the opposite end portion.

17. A machine of the class described, having, in combination, grippers with wide jaws adapted to engage the upper for a substantial distance along the edge of the last, and means for actuating the grippers to pull the upper, said actuating means having provision for tilting the jaws endwise while the upper is under tension.

18. A machine of the class described, having, in combination, grippers with wide jaws adapted to engage the upper for a substantial distance along the edge of the last, and means for actuating the grippers to pull the upper, said means having provision for bodily moving the grippers lengthwise of the shoe and for tilting the jaws endwise to lift the rear ends thereof relatively to the forward portions.

19. A machine of the class described, having, in combination, sectional jaws having substantially continuous gripping faces for gripping the upper at the opposite sides and the middle of the toe end of the last, means for lifting the grippers to pull the upper and means adapted to determine the relative lateral position of the said gripping means during the first part of the pulling movement and to permit the gripping means to assume a different relative lateral position when the upper has been pulled.

20. A machine of the class described, having means for gripping the upper at opposed sides of the shoe, actuating mechanism therefor, and means for holding the grippers spread apart during the gripping and initial pulling of the upper, said last mentioned means being constructed and arranged to permit the grippers to approach the last edge during the latter part of the pulling movement.

21. A machine of the class described, having sectional grippers for gripping the upper at opposed sides of the shoe, and means for initially positioning the said grippers wide apart to facilitate the insertion of the upper and adapted to permit the grippers to assume positions determined by the size and shape of the last when the upper is put under tension.

22. A machine of the class described, having curved sectional grippers formed and arranged with substantially continuous gripping faces for gripping the upper at the end and opposite sides of the shoe, and means for causing the grippers to pull the upper first obliquely outward away from the side faces of the last and then permit the grippers to move toward the last to wrap the upper about the side faces of the last.

23. A machine of the class described, having, in combination, means for gripping the upper at opposed sides of the shoe, and adjustable means for initially positioning the grippers at the two sides of the shoe different distances apart, said means being arranged to permit the grippers to adapt their relative position during the pulling movement to the size and shape of the shoe.

24. A machine of the class described, having, in combination, means for gripping the upper at opposed sides of the shoe, means for gripping and pulling the forward portion of an upper at the end and opposite sides of the toe of a last, and wipers movable inwardly and backwardly to force the pulled upper into lasted position, said machine having provision for imparting to the pulling means a forward movement to put the upper at the sides of the shoe under lengthwise tension to counteract the backward push of the wipers.

25. A machine of the class described, having, in combination, grippers for engaging an upper at the sides and end of the forward portion of a last and actuating mechanism for moving the grippers upwardly and forwardly to thereby strain the upper at the end and along the sides of the shoe in the directions in which the grippers are moved and then further actuating said grippers upwardly and backwardly to strain the upper at said points in the last-named direction.

26. A machine of the class described, having, in combination, grippers for engaging an upper at the sides and end of the forward portion of a last and actuating mechanism for moving the grippers upwardly and forwardly and then farther upwardly and backwardly, said mechanism being arranged to impart to the portions of the grippers holding the upper at the sides an upward movement relatively to the portion holding the upper at the toe end of the last.

27. A machine of the class described, having, in combination, grippers for engaging an upper at the sides and end of the forward portion of a last and means for actuating said grippers, means at the end and sides upwardly and forwardly to strain the upper for the full width thereof.

28. A machine of the class described, having, in combination, grippers provided with curved jaws presenting substantially continuous gripping faces for engaging the upper at the sides and end of the toe portion of a shoe and means for actuating the grippers upwardly and forwardly with relation to the last to apply continuous strain to the upper for the full width thereof, at the sides and end of the shoe.

29. A machine of the class described, having, in combination, grippers provided with curved jaws presenting substantially continuous gripping faces for engaging the upper at the sides and end of the toe portion of a shoe and means for actuating the grippers forwardly and upwardly and then tilting the grippers forwardly with relation to the last.

30. A machine of the class described, having, in combination, grippers for engaging the upper at the sides of the end portion of the last, means for actuating the grippers having provision for causing them to pull the engaged upper forwardly, and end lasting means movable backwardly and inwardly to force the pulled upper into lasted position.

31. A machine of the class described, having, in combination, forepart grippers for engaging the upper at the sides of the end portion of the last, means for actuating the grippers having provision for causing them to pull the engaged upper forwardly, forepart lasting means including side wipers arranged to have a component of backward movement in their operative stroke, and means to act on the upper at the sides of the shoe to counteract the effect of the backward push of the wipers.

32. A machine of the class described, having, in combination, toe lasting means including side wipers arranged to have a component of backward movement in their operative stroke, and means to force the upper at the sides of the shoe forwardly preparatory for the action of the wipers.

33. A machine of the class described, having, in combination, grippers for engaging the upper at the sides of the end portion of the last, means for actuating the grippers having provision for causing them to pull the engaged upper forwardly, toe lasting means including side wipers arranged to have a component of backward movement in their operative stroke, and means for holding the upper forwardly while the wipers move backwardly.

34. A machine of the class described, having, in combination, curved gripping jaws constructed and arranged to engage the upper at the end and opposite sides of a last, and means for shifting said gripping jaws as a unit transversely of the last.

35. A machine of the class described, having, in combination, gripping jaws constructed and arranged to engage the upper at opposite sides of a last, and means for shifting said gripping jaws together transversely of the last, said machine having provision for relaxing the tension on the upper while the jaws are being shifted.

36. A machine of the class described, having, in combination, grippers comprising sectional jaws arranged to engage the upper in a substantially uninterrupted line extending around the toe of the last, said grippers being movable about adjacent axes to conform to the contour of the toe, and means for actuating the grippers.

37. A machine of the class described having, in combination, sectional grippers comprising adjacent pivotally mounted sections arranged to engage the upper in a substantially uninterrupted line extending around the toe of the last and arranged for relative angular movement about separate axes which are spaced laterally apart to adapt them to the contour of the edge of the last.

38. A machine of the class described having, in combination, grippers comprising adjacent sectional pairs of curved jaws arranged to engage the upper in a substantially uninterrupted line extending around the toe of the last, and means for supporting the pairs of jaws to permit the sections to move angularly about separate axes which are spaced laterally apart to adapt their relative positions to the adjacent edge contour of the last.

39. A machine of the class described having, in combination, grippers comprising adjacent sectional pairs of jaws for gripping adjacent edge sections of upper, means for supporting the pairs of jaws to permit the sections to move angularly to adapt their relative positions to the adjacent edge contour of the last, and means for restoring the sections to a normal relation after each operation of the machine.

40. A machine of the class described having, in combination, grippers having curved jaws adapted to grip the upper at the opposite sides and end of the toe portion of a shoe, means for lifting the grippers to pull the upper at the end and sides of the toe, and means for later lifting the rear ends of the jaws to pull the upper at the sides with relation to the upper at the toe end.

41. A machine of the class described having, in combination, toe grippers having curved jaws adapted to grip the upper at the opposite sides and end of the toe portion of a shoe, means for lifting the grippers to pull the upper at the end and sides of the toe, and means for rocking the jaws to apply additional tension to the belt of gripped upper extending transversely across the top of the last.

42. A machine of the class described having, in combination, gripping means comprising toe end gripper sections relatively movable angularly with relation to each other and additionally movable as a unit transversely of the shoe, and means permitting movement of the grippers sections independently.

43. A machine of the class described having, in combination, gripping means comprising gripper sections relatively movable angularly and means for adjusting said sections as a unit.

44. A machine of the class described having, in combination, gripping means comprising sections relatively movable angularly with relation to each other and also transversely of the shoe, and separate devices for effecting the said adjustments.

45. A machine of the class described having, in combination, gripping means comprising sections relatively movable angularly with relation to each other and also transversely of the shoe, and means by which said two adjustments can be effected.

46. A machine of the class described having, in combination, gripping means comprising sections relatively movable angularly with relation to each other and also transversely of the shoe, and one manually controlled device arranged for shifting the grippers transversely of the last during one part of its throw and for both transversely and angularly adjusting the grippers during another part of its throw.

47. A machine of the class described having, in combination, gripping means comprising relatively adjustable toe gripper sections connected together for adjustment simultaneously.

48. A machine of the class described having, in combination, gripping means comprising relatively adjustable curved toe gripper sections operatively connected for adjustment together in opposite directions.

49. A machine of the class described having, in combination, gripping means comprising sections relatively movable angularly with relation to each other and also transversely of the shoe, means by which the two adjustments can be effected, and means for varying the relative transverse and angular adjustments produced.

50. A machine of the class described having, in combination, gripping means comprising sections relatively movable angularly with relation to each other and also transversely of the shoe, said means permitting free angular movement of the gripper sections during a portion of the machine's operation, and means for restoring the grippers to a predetermined angular relation preparatory to the next operation.

51. A machine of the class described having, in combination, end lasting wipers and supporting means having a guideway curved about a center located a substantial distance back from the adjacent end of the last and in which the wipers are freely movable around the toe end of the last to position themselves for different shapes of lasts.

52. A machine of the class described having, in combination, shoe resting means, end lasting wipers, wiper operating means and supporting means therefor having a bearing located in front of the shoe in which the wipers are bodily movable relatively to their supporting means and operating means transversely of the last in a curved path about a center located a substantial distance back from the adjacent end of the last.

53. A machine of the class described having, in combination, grippers adapted for pulling an upper at the toe end of a last and arranged for lateral movement to adapt them to the lateral position of the last, and toe lasting wipers also arranged for lateral movement with relation to the last.

54. A machine of the class described having, in combination, grippers adapted for pulling an upper at the toe end of a last and arranged for lateral movement to adapt them to the lateral position of the last, and toe lasting wipers arranged for free bodily movement in a curved path around the toe end of the last.

55. A machine of the class described having, in combination, lasting devices including grippers adapted for pulling an upper at the toe end of a last and arranged for angular movement transversely of the last, and toe wipers bodily movable around the toe end of the last to adapt their lateral position to the location of the last.

56. A machine of the class described having, in combination, end lasting means comprising side wiper plates and a connecting wiper plate, and a support having a guideway for the connecting plate curved around the toe of the last.

57. A machine for working an upper over a last, having in combination, a gripper, a lever to which the gripper is pivotally connected and by which it is uplifted for pulling the upper, and means for moving perpendicularly to the direction of the pulling strain during the pulling operation the portion of the lever to which the gripper is connected.

58. A machine for working an upper over a last, having in combination, a gripper, and a lever to which the gripper is connected and by which it is uplifted for pulling the upper, said lever being movable endwise during the pulling operation to shift the point of connection with the gripper.

59. A machine for working an upper over a last, having in combination, a gripper, a lever to which the gripper is connected and by which it is uplifted for pulling the upper, said lever being formed in two relatively endwise movable sections and means for moving said sections relatively during the pulling operation.

60. A machine for working an upper over a last, having in combination, a gripper, a lever to which the gripper is connected and by which it is uplifted for pulling the upper, said lever comprising a gripper supporting section which is endwise movable on the main section, and means adapted to become operative during the pulling operation for shifting said section.

61. A machine for working an upper over a last, having in combination, grippers and actuating mechanism therefor including a lever arranged for rocking movement to uplift the grippers and also for movement automatically in a different direction during the pulling operation to modify the strain effected by the grippers.

62. A machine for working an upper over a last, having in combination, curved grippers for engaging the upper at the end and opposite sides of the toe of a shoe, means for actuating the grippers to pull the upper, and means for holding the grippers initially spread from the edges of the last to pull the upper outwardly therefrom, said means being constructed and arranged to permit the grippers to approach the edge of the last at the sides but not at the end of the toe as they rise.

63. A machine for working an upper over a last, having in combination, curved grippers for engaging the upper at the end and opposite sides of the toe of a shoe, means for actuating the grippers to pull the upper, and means for holding the grippers initially spread from the edges of the last to pull the upper outwardly therefrom, said means being constructed and arranged to permit the grippers to approach the edge of the last at the sides and to cause them to move farther outwardly from the edge at the toe end as they rise in pulling the upper.

64. A machine of the class described having, in combination, grippers adapted for pulling an upper at the toe end of a last, said grippers comprising an inner jaw that is shaped to center the last laterally in the machine and being adjustable transversely of the machine.

65. A machine of the class described having, in combination, side and toe grippers, said toe grippers being formed and arranged to present a toe end abutment for the last and to position the last laterally with relation to the side grippers, and means permitting said toe gripper to be fixed in different positions of transverse adjustment relatively to the side grippers.

66. A machine of the class described having, in combination, shoe supporting means and toe lasting means comprising a wiper supporting head having an arc-shaped guideway and wipers mounted for lateral curvilinear adjustment in said guideway in a path having its approximate center under the forward portion of the shoe at a substantial distance back from the toe end of the last.

67. A machine of the class described having, in combination, shoe supporting means and lasting means comprising a wiper supporting head having an arc-shaped guideway and wipers which are bodily movable laterally in said guideway about a center located back of the adjacent end of the last and capable of angular positioning movement to face toward the right or the left of the median line of the machine to engage similarly the two sides of a right or a left crooked last.

68. A machine of the class described having, in combination, curved grippers formed and arranged to seize an upper throughout substantially the full width of the fore part of the shoe, and means for actuating the grippers forwardly to tension the vamp and adjacent portions of the quarters lengthwise of the last and maintain the upper under tension until the upper is secured.

69. A machine of the class described having, in combination, curved grippers formed and arranged to seize an upper throughout substantially the full width of the fore part of the shoe, and means for actuating the grippers lengthwise of the last and upwardly to stretch the entire upper longitudinally and also to actuate the grippers to draw the upper over the toe portion of the last while still under tension.

70. A machine of the class described having in combination, grippers and actuating means for pulling an upper at the toe and opposite sides of a shoe, said means being constructed and arranged to cause the grippers to pull upwardly on the portions of the upper at the sides of the shoe relatively to the portion at the end.

71. A machine of the class described having in combination, grippers for seizing an upper at the toe end and sides of a shoe, and actuating means to cause the grippers to pull the upper with greater force at the sides than at the toe end.

72. In a machine of the class described, the combination with means for supporting a last, of wipers constructed and arranged to embrace the toe portion of a shoe, rub the upper upwardly along the side face of the last, and then wipe the upper inwardly over the edge of the last, means for gripping the upper at opposite sides of the toe end and holding it under strain during the upwardly rubbing and inwardly wiping action of the wipers, and means for imparting relative movements to said last support, wipers and grippers for the purposes described.

73. A machine for working an upper over the fore-part of a last having, in combination, end embracing wipers, grippers comprising two pairs of jaws separate from the wipers and formed and arranged to engage the upper at the curved portions of the toe on opposite sides of the end of the toe, means for relatively actuating the grippers and the last in a direction to tighten the upper and maintain it under tension until the wipers engage it and separate means for actuating the wipers to lay the upper into lasted position about the toe of the last.

74. A machine of the class described having, in combination, grippers arranged to engage the upper about the toe end of a last, means for actuating said grippers relatively to the last to updraw the upper and also to outdraw it, toe embracing wipers, and means for operating them to wipe the upper up the side faces of the last and inwardly toward the bottom of the toe while the grippers maintain the outdrawing strain on the margin of the upper.

In testimony whereof I have signed my name to this specification in the presence of two subscribing witnesses.

RONALD F. McFEELY.

Witnesses:
CHARLES H. HOYT,
ARTHUR L. RUSSELL.

Corrections in Letters Patent No. 1,135,952.

It is hereby certified that in Letters Patent No. 1,135,952, granted April 13, 1915, upon the application of Ronald F. McFeely, of Beverly, Massachusetts, for an improvement in "Apparatus for Making Boots and Shoes," errors appear in the printed specification requiring correction as follows: Page 8, line 82, claim 27, strike out the comma and the word "means;" page 9, line 87, claim 42, before the word "gripping" insert the words *toe end;* same page and claim, line 88, strike out the words "toe end;" and that the said Letters Patent should be read with these corrections therein that the same may conform to the record of the case in the Patent Office.

Signed and sealed this 18th day of January, A. D., 1916.

[SEAL.]

J. T. NEWTON,
*Acting Commissioner of Patents.*

Cl. 12—4.